April 26, 1932. P. KRANZ ET AL 1,855,763
APPARATUS FOR MAKING FRINGES, TRIMMINGS, AND THE LIKE
Filed Jan. 7, 1929 8 Sheets-Sheet 1

Fig.1.

INVENTORS:
PHILIP KRANZ.
ALBERT P. SCHMID,
BY
ATTORNEYS

April 26, 1932.  P. KRANZ ET AL  1,855,763
APPARATUS FOR MAKING FRINGES, TRIMMINGS, AND THE LIKE
Filed Jan. 7, 1929   8 Sheets-Sheet 6

INVENTORS:
PHILIP KRANZ,
ALBERT P. SCHMID,
By
ATTORNEYS.

INVENTORS:
PHILIP KRANZ,
ALBERT P. SCHMID,
By Niedersheim Fairbanks
ATTORNEYS.

Patented Apr. 26, 1932

1,855,763

UNITED STATES PATENT OFFICE

PHILIP KRANZ AND ALBERT P. SCHMID, OF PHILADELPHIA, PENNSYLVANIA, ASSIGNORS TO BERNARD WILMSEN, OF PHILADELPHIA, PENNSYLVANIA

APPARATUS FOR MAKING FRINGES, TRIMMINGS, AND THE LIKE

Application filed January 7, 1929. Serial No. 330,866.

Our invention relates to a new and useful apparatus for making fringes and trimmings and the like whereby a novel, durable and ornamental fringe is automatically and expeditiously produced in a novel, efficient, and economic manner.

It has been the practice heretofore in making fringes and similar ornamental trimmings, particularly of the kind ordinarily used for Christmas tree decoration and commonly known in the trade as tinsel, to interweave given lengths of varicolored strands or filaments with one or more threads which form the base or support from which the strands or filaments depend. Due to the frail and tenuous character of the strands or filaments forming the fringe, it was necessary to interweave such strands with the supporting threads rather loosely, with the result that due to slippage of the individual strands or filaments, the finished product presented an irregular edge, and in time, due to the loss of the more loosely interwoven strands, the fringe materially deteriorated in its ornamental value.

It is therefore the object of our invention to obviate these disadvantages and to produce a novel apparatus whereby ornamental fringes may be automatically produced wherein the strands or filaments are sewn or stitched to a supporting strip of tape preferably doubled upon itself in a novel manner so as to prevent loss of strands or irregularity in the edge of the finished product.

A further object of our invention is to produce a novel apparatus, whereby double lengths of fringe or trimming are simultaneously produced and separately and independently wrapped or wound around a novel core or blank of our invention.

A still further object of our invention is to produce a novel apparatus whereby fringes or trimmings are produced in definite predetermined, commercial, standard lengths without the necessity of measurement on the part of the attendant or operator of the machine.

To the above ends, our invention consists of means for actuating or propelling two tapes or strips of fabric, means for folding or doubling each of said strips upon itself, means for winding any desired strands or filaments transversely about said tapes, means for stitching said strands to said doubled or reinforced tapes, means for cutting said strands at a point intermediate and parallel to said tapes, tensioning devices for said tapes, a measuring device to predetermine the length of fringe thus formed, and means for winding the finished fringe on a suitable card or support automatically and in predetermined lengths.

Our invention further consists of novel means for doubling or folding each one of a pair of tapes upon itself, supporting and propelling said tapes, and winding filaments transversely around said doubled tapes and their support during the progress of said tapes and filaments to the cutting devices.

It further consists in the employment of resilient feed rolls adjustably supported, rotary cutting devices in the rear of said feed rolls, a presser foot through which the upper rotary cutter passes, and a lower supporting plate, through which the lower cutter passes.

It further consists of a novel construction of rotatable pockets adapted for the reception of flexible blanks upon which the predetermined lengths of fringe are wound.

It further consists of novel driving and actuating mechanism, whereby the automatic doubling of the tapes, the propulsion of the doubled tapes and filaments, the stitching, cutting, measuring, and reeling thereof is synchronously and automatically effected.

It further consists in the novel method of making fringes herein described.

Our invention further relates to various other novel features of construction and advantage which will be hereinafter described and claimed.

For the purpose of illustrating our invention we have shown in the accompanying drawings one form thereof which is at present preferred by us, since the same has been found in practice to give satisfactory and reliable results, although it is to be understood that the various instrumentalities of which our invention consists can be variously arranged and organized and that our invention is not limited to the precise arrangement and organization of the instrumentalities as herein shown and described.

Fig. 2 is a side elevation of a portion of the front or upper end of Fig. 1 viewed from the left hand side.

Figure 6ª represents a perspective view of certain parts seen in Figure 6.

Fig. 10 represents a front elevation of Fig. 9.

Figs. 11 and 12 represent perspective views of a blank and retaining pin to be hereinafter referred to.

Figure 1:
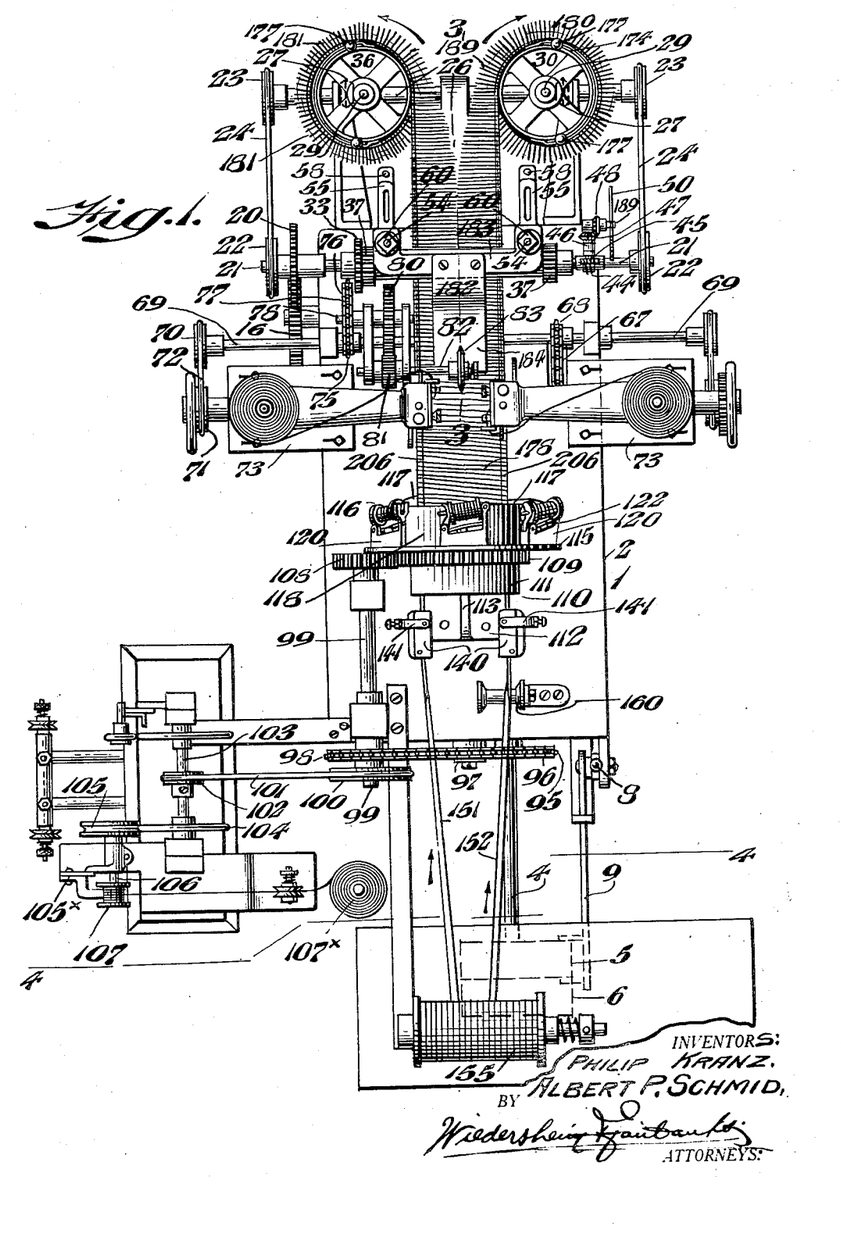
Fig. 1 represents a top plan view of a novel fringe making machine, embodying our invention.
Figures 2, 6A:
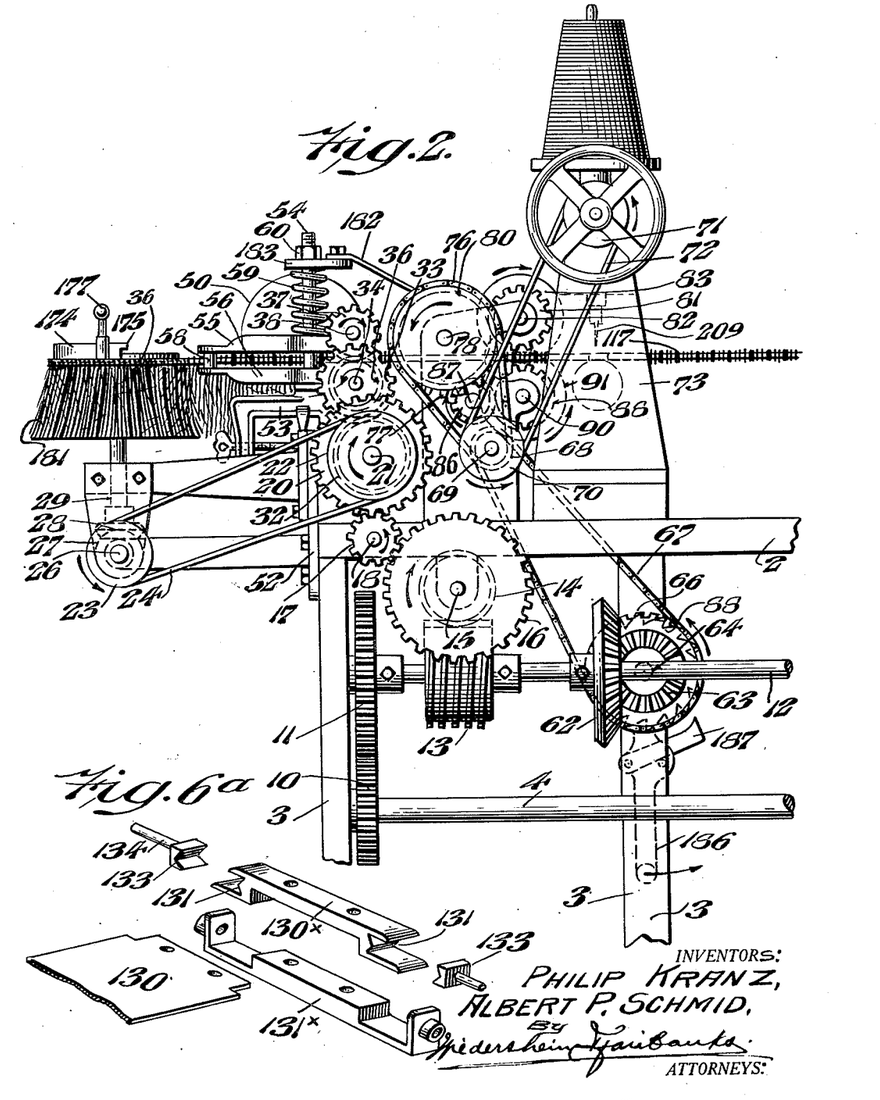
Figure 5:
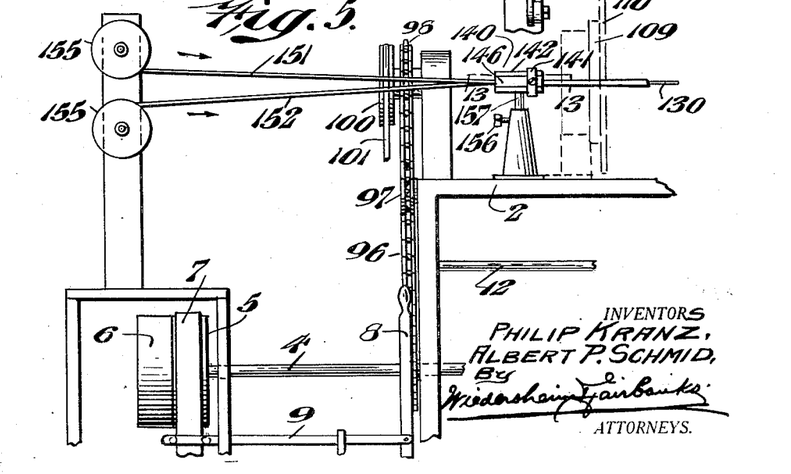
Fig. 5 represents a fragmentary view in side elevation showing the rear portion of our novel machine.

Referring to the drawings, in which similar numerals of reference indicate corresponding parts, and particularly to Figs. 1 and 2, 1 designates a novel fringe making machine embodying our invention, comprising a table 2 suitably supported on the legs or other supports 3. 4 designates the main driving shaft which is provided at its rear end with the fast pulley 5 and loose or idler pulley 6, and the driving belt 7 which is actuated by a source of power, not shown. 8 designates a belt shifting lever which is enabled by means of a link 9 to shift the belt 7, whereby the latter may be shifted from the fast pulley 5 to the loose pulley 6, or vice versa, to drive or to stop the main shaft 4 as may be desired, as will be understood from Fig. 5. The main shaft 4 is provided with the pinion 10, see Fig. 2, which meshes with the gear 11 fast on the upper shaft 12 to give motion to the latter, said shaft 12 being provided with the worm 13, which meshes with the pinion 14 fast on the transverse shaft 15 which carries also the gear 16 which meshes with the pinion 17 on the shaft 18. The pinion 17 meshes with the gear 20 fast on the shaft 21, the latter being provided with the pulley 22 which gives motion to the pulley 23 by means of the belt 24 to actuate the two-part shaft 26 which carries the bevel pinions 27 in mesh with the bevelled pinions 28 fast on the upright shafts 29 to rotate the winding drums 30 upon which the finished product is wound in a manner hereinafter described. The shaft 21 also carries the gear 32 which meshes with the pinion 33 fast on the shaft 34 to impart motion to the latter, see Fig. 1.

The shaft 34 is provided with the gear 36 which meshes with the pinion 37 fast on the upper shaft 38 to drive the upper and lower tension rollers 40 and 41, see Figs. 2 and 3, hereinafter referred to. The shaft 34 is provided with the worm 44 (see upper right hand portion of Fig. 1 and Fig. 18) which meshes with the pinion 45 on the stub shaft 46, which carries the beveled gear 47 in mesh with the bevel gear 48 on the stub shaft 49 at the outer end of which is the graduated dial measuring plate 50, see Figs. 17 and 18.

Figures 3, 13, 14, 15, 16:
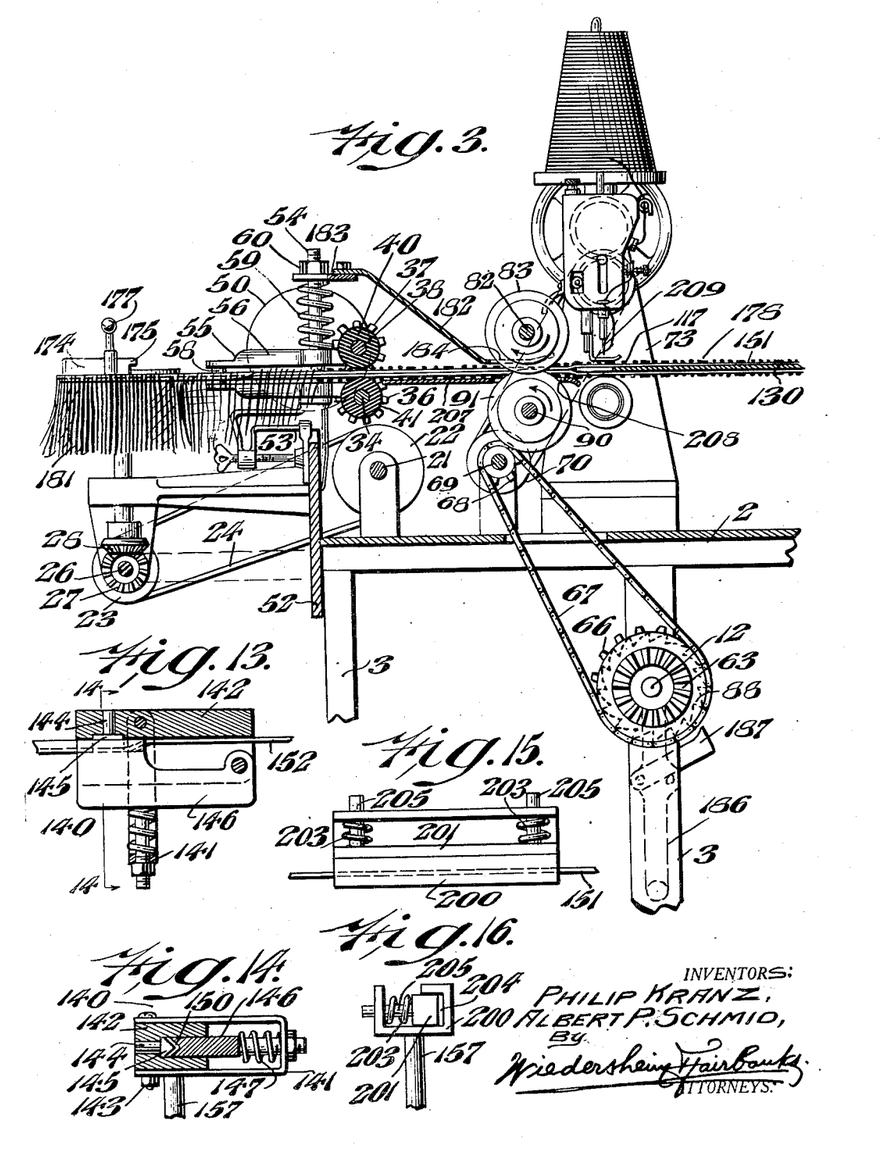
Fig. 3 represents a fragmentary sectional view on line 3—3 of Fig. 1.
Fig. 13 represents on an enlarged scale a sectional view of the tape tensioning device taken on line 13—13 of Fig. 5, certain parts being shown in elevation.
Fig. 14 represents a sectional view on line 14—14 of Fig. 13.
Fig. 15 represents a side elevation of a modified form of a tape tensioning device.
Fig. 16 represents an end view of Fig. 15.
Figures 17, 18, 19, 20:
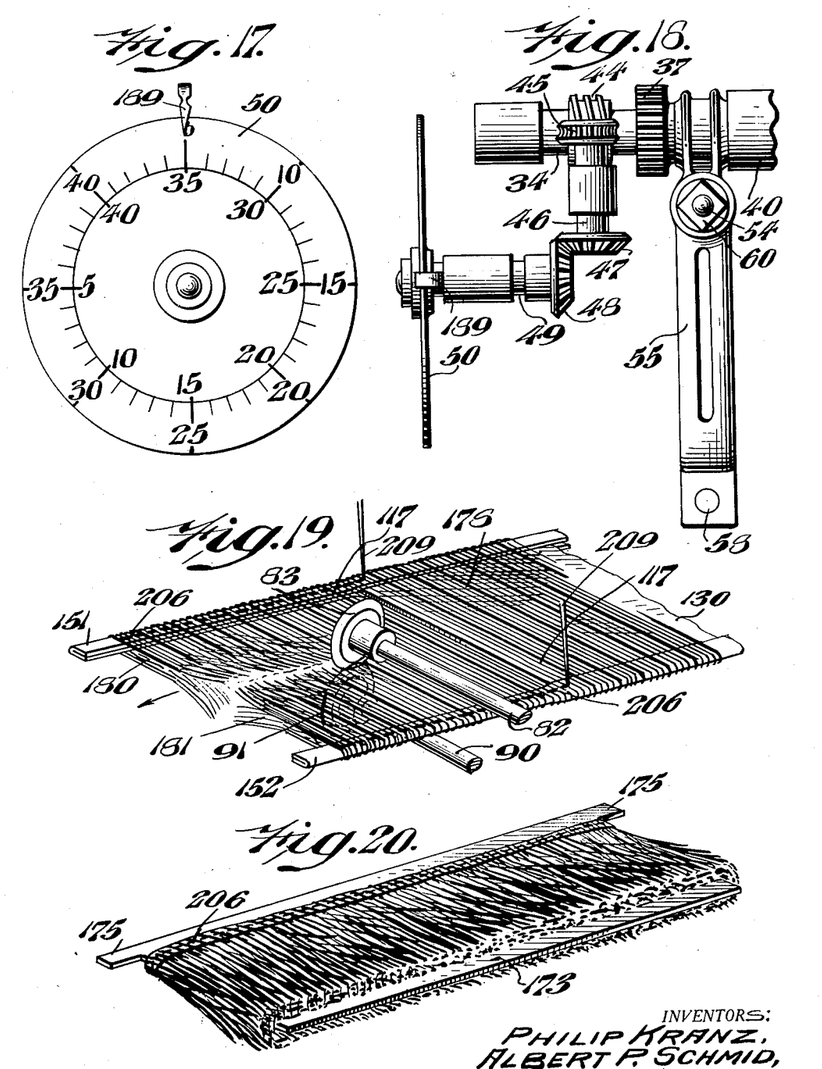
Fig. 17 represents a side elevation of a graduated dial for indicating the length of the fringe formed.
Fig. 18 represents a fragmentary plan view showing on an enlarged scale the actuating mechanism of the measuring dial shown in Fig. 17.
Fig. 19 represents a fragmentary perspective view of the fringe formed by our novel machine illustrating diagrammatically the manner of stitching the fringe to the tapes and simultaneously cutting the fringe intermediate said tapes.
Fig. 20 represents a finished product of our machine automatically wound around a card in predetermined lengths.

To the table 2 is suitably secured the upright 52, see Figs. 2 and 3, which supports the clamp 53, having the upwardly extending stems 54, which pass through the upper and lower jaws 55 and 56 which carry the rollers 40 and 41, see Figs. 3 and 18. The clamps 55 and 56 are connected at their outer ends by the pins 58 and are tensioned by the springs 59, on the stems 54, the tension being adjusted by the adjustment nuts 60, see Figs. 1, 2, and 3.

Figure 4:
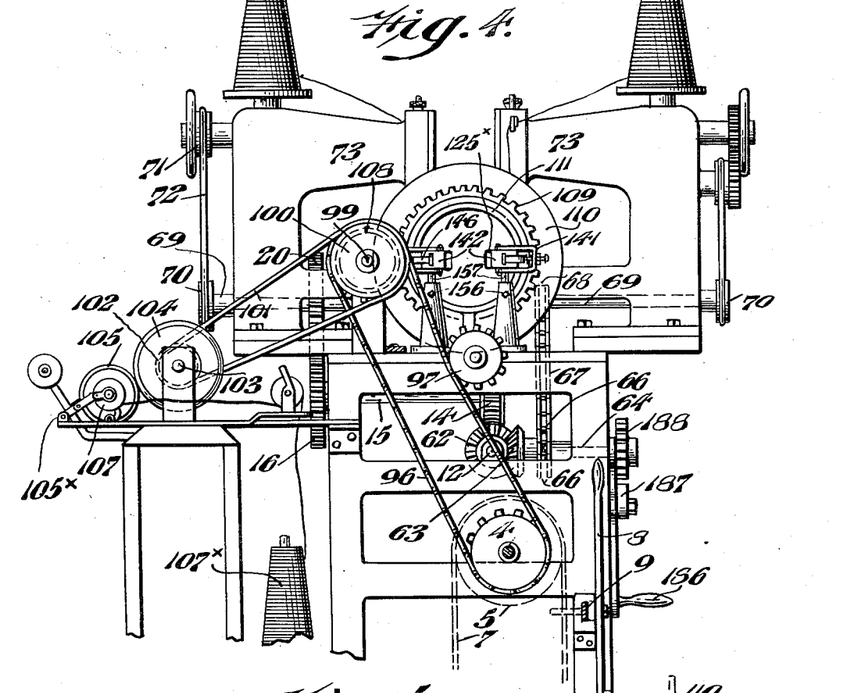
Fig. 4 represents a sectional view on line 4—4 of Fig. 1.

The shaft 12 also carries a beveled gear 62 (Fig. 2) which meshes with the beveled pinion 63 on the stub shaft 64 (Fig. 4) which carries the sprocket wheel 66 over which passes the sprocket chain 67. The sprocket chain 67 drives the sprocket wheel 68 on the shaft 69 which also carries the pulley 70 (Fig. 2) which latter transmits motion to the pulley 71 by means of the belt 72 to operate a conventional sewing machine 73 to be hereinafter referred to. There are two sewing machines, as seen in Figs. 1 and 4. The shaft 69 is provided with the inner sprocket wheel 75 (see Fig. 1) which is connected by the sprocket chain 76 to the sprocket wheel 77 on the shaft 78 to impart motion to the latter. The shaft 78 is provided with the inner gear 80 which meshes with the pinion 81 on the shaft 82 to revolve the upper cutter 83. The gear 80 also meshes with the pinion 86 on shaft 87, see Fig. 2, said pinion 86 being also in mesh with the gear 88 on the shaft 90 to revolve the lower cutter 91, see Fig. 19.

The main shaft 4 carries the sprocket wheel 95, see Figs. 1 and 4, which drives the sprocket wheel 98 on the shaft 99 by the sprocket chain 96 passing over the tension idle roller 97. The shaft 99 carries at its rear end the pulley 100 over which passes the belt 101 which drives the pulley 102 on the shaft 103 to revolve the latter. The shaft 103 carries the rubber tired disc 104 which frictionally engages the grooved pulley 105 to drive the shaft 106 which carries and revolves the spool 107, for refilling the latter from the source of supply 107x, said spool being used in and forming part of the sewing mechanism 73. The shaft 106 carrying the pulley 105 is carried by the pivoted arm 105x, whereby the pulley 105 may be engaged with or disengaged from the actuating disc 104, as will be understood from Fig. 4.

Figure 6:
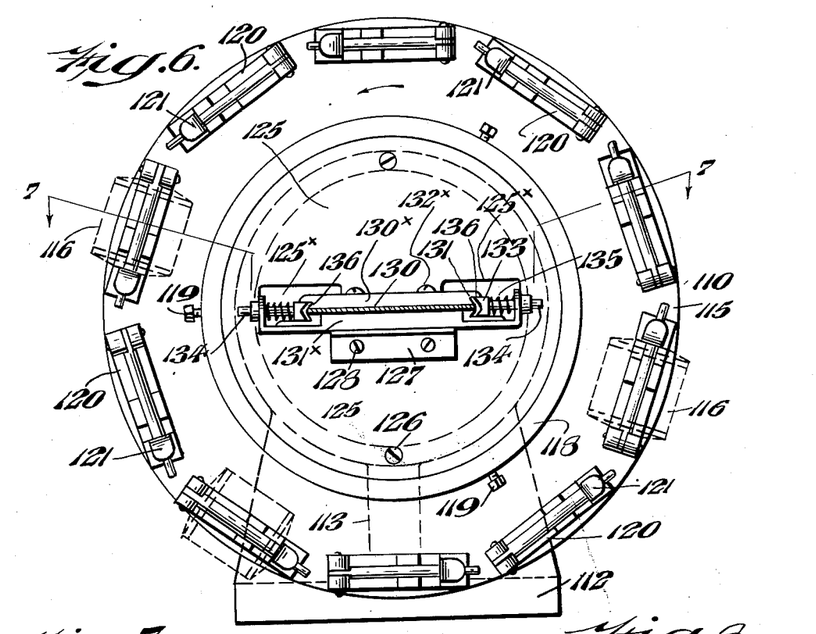
Fig. 6 represents on an enlarged scale a front view of the spool head shown detached, certain parts being shown in section on line 6—6 of Fig. 7.
Figures 7, 8:
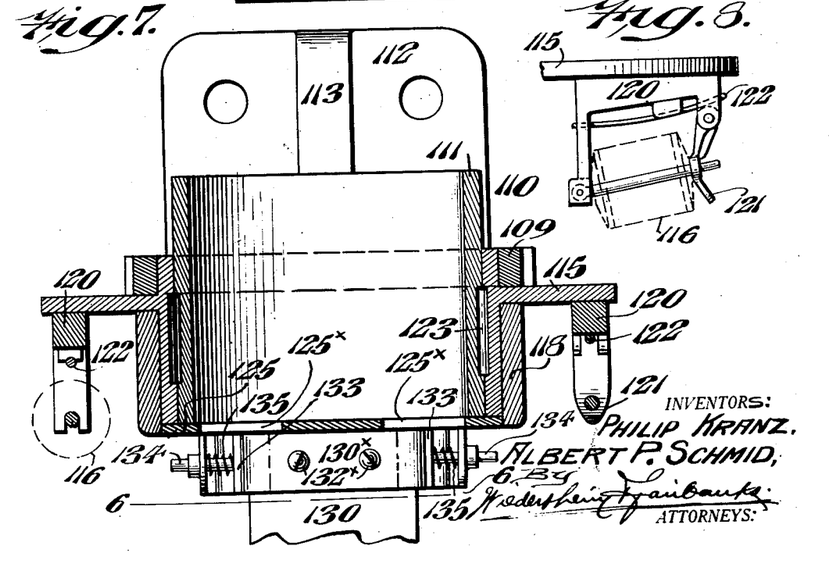
Fig. 7 represents a section on line 7—7 of Fig. 6.
Fig. 8 represents a plan view of one of the spools and spool holders carried by the spool head in Fig. 6.

The spool head or carrier 110 comprises the stationary cylindrical bearing member 111 suitably supported by the foot or bracket 112 secured to the table 2 and provided with the reinforcing rib 113, see Figs. 1, 4, and 7. The gear 109 revolves the spool carrier disc 115 which carries at its outer periphery the spools indicated in Figs. 1 and 8 at 116, and is retained in position by the outer collar 118 secured by set screws 119. The gear 109 is rotated by the pinion 108 fast on the shaft 99, see Fig. 1. The spools 116 are carried by the brackets 120 and are held in place by the pivot clamp 121 which is held under tension by the spring 122, see Fig. 8. The stationary cylindrical member 111 has an annular recess at 123 to reduce friction. 125 designates an outer plate having the openings $125^x$ and secured by the screws 126 to the cylindrical member 111 which carries the bracket 127 fastened thereto by the screws 128, said bracket in turn supporting the inner horizontal stationary plate 130. The V-shaped heads 133 carried by the pins 134 and under tension of the springs 135 co-act with the wedge-shaped edges 131 of the bracket 130x secured to the bracket 131x by the bolts 132x, the plate 130 being thus clamped between the bracket 130x and 131x so that in the bracket 130x are formed V-shaped slots 136, see Figs. 6, 6a and 7.

Referring now to Figs. 1, 5, 13, and 14, 140 designates a pair of tape folding devices comprising the bracket 141 in which is secured the block 142 by the bolt 143. 144 designates a pin having the wedge shaped head 145 which co-acts with the pin 146 tensioned by the spring 147, the free end of said pin being V-shaped to form the V-shaped slot 150 through which the tapes 151 and 152 from the spools 155 are adapted to pass before reaching the spool head 110, as will be understood from Figs. 1 and 14. The tape folding devices 140, which are two in number and oppositely disposed, are suitably secured to the table 2 and may be vertically adjusted by the set screw 156 engaging the supporting rods 157. 160 designates an idler which is secured to the table 2 which may be employed to insure parallelism of the tapes 151 and 152, if necessary. After leaving the tape folding devices 140, the tapes 151 and 152 pass through the slots 136 in the spool head 110 above described.

Figure 9:
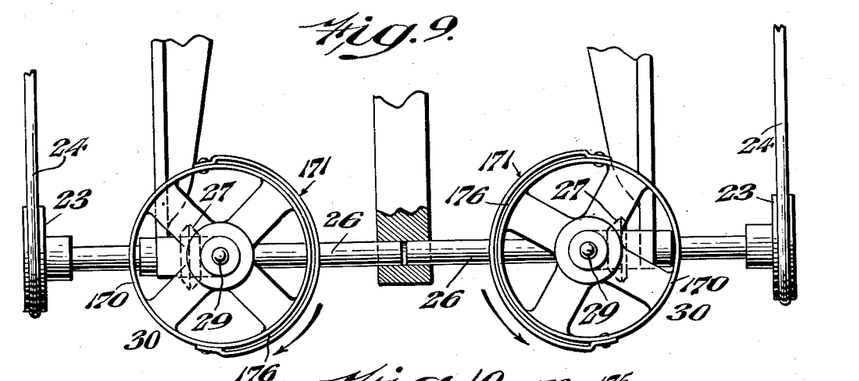
Fig. 9 represents a fragmentary plan view of the winding drums for winding the fringe.
Figures 10, 11, 12:
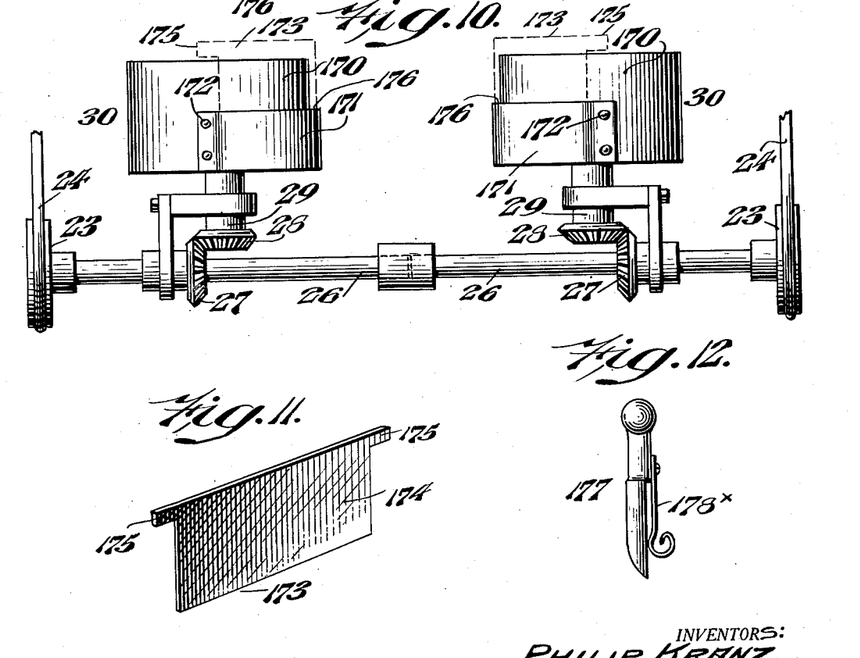

The winding drums 30, seen in Figs. 1, 9, and 10, comprise the cylinders 170 to the outer circumference of which are secured the semi-circular bands 171 by the rivets 172, said bands being of lesser height than and slightly spaced from the cylinders 170. 173 designates a blank of pasteboard, cardboard or the like which is provided with the pendant rectangular portion 174 and the upper terminal flanges 175, said blank being adapted to be deflected around and inserted in the semi-circular slot or pocket 176 formed between the cylinders 170 and the bands 172, the major portion of said blank projecting above said pocket, see Fig. 10. In Fig. 12 we have illustrated a retaining pin 177 having the tension finger 178x which is used to hold the blank 173 in position around the cylindrical portion 172 of the drums 30 while the finished fringe is being wound around said drums as will be understood from Figs. 1, 2, 3, and 20.

In Figs. 15 and 16 we have shown a modified form of a tape guide and tension device which may be used in lieu of the folding and tension device illustrated in Figs. 13 and 14 and which consists of the bracket 200 in which is positioned the block 201 which is tensioned by the spring 203 carried by the stem 205. Between the outer edge of the block 201 and the juxtaposed portion of the bracket 200 is formed the slot or opening 204 through which the tapes 151 and 152 are adapted to pass, as will be understood from Figs. 15 and 16.

The operation is as follows:

The tapes 151 and 152 are drawn from the spools or bobbins 155 and travel in the direction of the arrows in Figs. 1 and 5 and pass through the tape folding devices 140 whereby said tapes are preliminarily folded or doubled upon themselves, the tapes emerging from the folding devices 140 entering the spool head 110 where they are further folded by passing through the slots 136, see Fig. 6. As the spool carrier 115 carrying the filament spools 116 is revolved by the gear 109 in the manner described, the filaments 117 are wound transversely around the parallel folded tapes 151 and 152 (see Fig. 1) and the plate 130 thereby forming a continuous fabric 178. As the strand or filament covered tapes progress they are supported by the plate 130 and pass through the sewing machines 73 whereby the strands 117 are sewed or stitched to the respective doubled or folded tapes in a conventional manner, the line of stitching being indicated at 206 in Figs. 1, 19, and 20. After being stitched the fabric 178 passes between the upper and lower cutters 83 and 91, which cut the strands or filaments 117 transversely intermediate the tapes 151 and 152, see Figs. 1 and 19, thereby simultaneously forming two separate fringes 180 and 181, see the top of Fig. 1, which are then wound around the blanks 173 carried by the drums 30, as will be clearly understood from Figs. 1, 2, and 3. The rollers 40 and 41 heretofore described serve to tension and propel the fabric 178.

The arm 182 is secured at its upper end to the bracket 183 carried by the stems 54 of the bracket or clamp 53 and is provided with the lower horizontal portion 184 which serves as a presser foot and is slotted to receive the cutting edge of the upper cutter 40, as will be understood from Fig. 3. The presser foot 184 serves to position the strands or filaments 117 while the same are being cut by the cutters 83 and 91 until the cut or severed fabric 178 has reached the feed rollers 40 and 41, whence the severed fabric, in the form of the duplicate fringes 180 and 181, progresses towards the drums 30 as hereinbefore stated. During the cutting of the fabric it is supported on the bottom plate 207 having the slot 208 therein, through which the lower cutter 91 passes, as seen in Fig. 3. The spools 116 may contain strands of different colors, and when it is desired to change one of the said spools, the machine is stopped by means of the lever 8 and its adjuncts and the spool head 110 can then be revolved slowly by means of the ratchet handle 186, see Figs. 2 and 4, which rigidly carries the pawl 187 which co-acts with the ratchet wheel 188 to revolve the shaft 64. By thus manually revolving the spool head or carrier 110, it is possible to bring any desired spool 116 to an upper accessible position for adjustments or replacements, as may be desired. The manually operable handle 186 and its adjuncts is also useful in driving the machine slowly to observe any defects in production or to effect adjustments which may be needed.

In order to produce our novel fringe in accurately predetermined lengths without the necessity of manual measurement, we provide the rotary measuring dial disc 50 (see Figs. 17 and 18) which co-acts with the fixed pointer or index 189 said dial disc 50 being driven by the shaft 49 and its adjuncts in the manner hereinabove described. Thus, when the pointer 189 registers with the zero mark on the dial disc 50 and the machine is set in motion, six yards of fringe (or any other desired amount to which the machine may be adjusted) are produced and wound around the cardboard blank 173 positioned in the drums 30 for every complete revolution of said dial disc 50. The fringes 180 and 181 are then severed in proximity to the drums 30 and the supporting cardboard blank 173, is withdrawn from the slot 176 in said drums 30, after the retaining pin 177 has been removed. The blanks 173 with the fringes 180 and 181 wound thereon now appear as shown in Fig. 20. Thus, by our novel machine we not only dispense with the necessity of measuring the amount of fringe produced but we also dispense with the necessity of manually winding said fringe on the card such as the blank 173 hereinabove described, thus securing a more efficient, economical and accurately measured product.

It will be seen that the pendant rectangular portion 174 of the blank 173 is slightly wider than the length of the strands forming the fringes 180 and 181 so that said strands or filaments are adequately supported in a rectilinear position thus preventing entanglements and premature wear and tear.

It will thus be seen that our novel fringe making machine is adapted to a continuous process of producing fringes of the character described since the tapes 151 are automatically fed from the spools 155 through the folding devices 140 and through the spool head 110, where they are further folded and deflected by the wedge shaped heads 131 near the supporting plate 130 so that when the tapes emerge from the spool head and the strands or filaments 117 are wound therearound each of the tapes is doubled upon itself and the strands are firmly stitched thereto by the sewing machines 73.

Our novel machine further provides automatic feeding and tensioning means for propelling, stretching, and guarding the fabric 178 while the same is being cut and wound around the drums 30. As above stated, by merely observing the progress of the dial plate 50 and severing the fringes in proximity to the drums when said plate has made a complete revolution, accurately predetermined lengths of fringe wound around the blanks 173 are obtained, it being merely necessary to remove the blanks 173 from the drums 30 and insert a fresh blank, whereupon the machine can be again set in motion.

Figures 21, 23, 24:
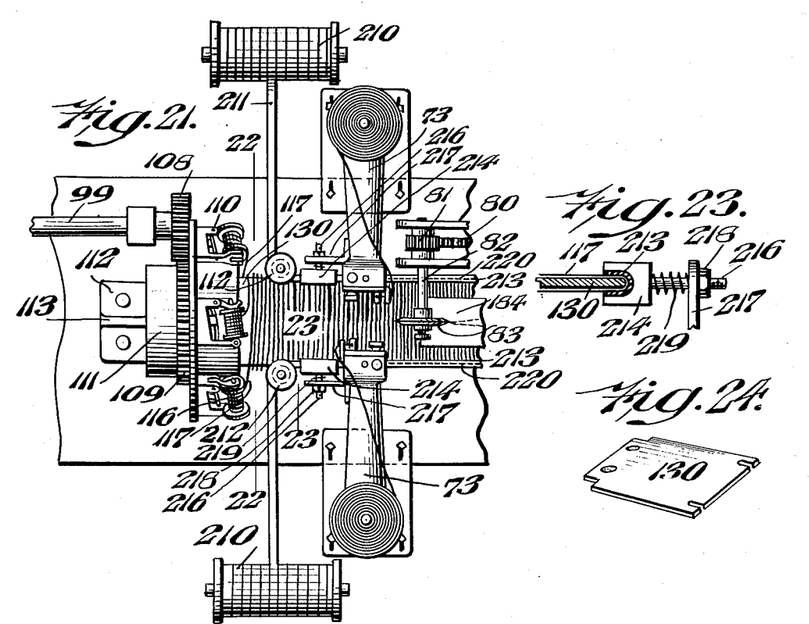
Figure 21 represents a plan view of a portion of a modified construction showing the spool carrier, tape feeding devices the stitching and cutting mechanism, the tape guiding and doubling devices being shown differently arranged from the construction seen in Figure 1.
Figure 23 represents a section on line 23—23 Figure 21.
Figure 24 represents a perspective view of the supporting plate seen in Figure 1 around which the fringe filaments are transversely wound, said plate being shown in detached position.
Figure 22:
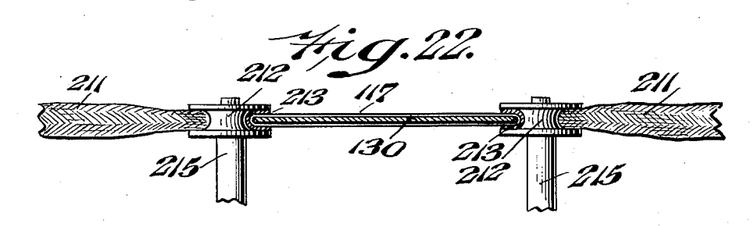
Figure 22 represents a section on line 22—22 Figure 21, certain portions being shown in section.
Figure 25:
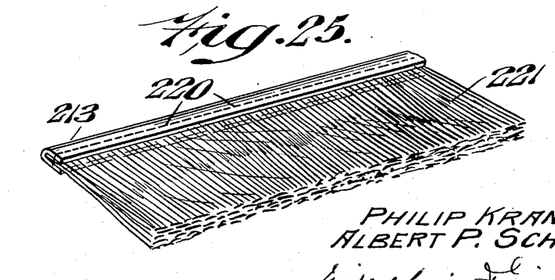
Figure 25 represents a perspective view of the finished fringe formed in the machine seen in Figure 21.

We desire to call especial attention to the function of the plate 130, which extends forwardly from the spool carrier as will be understood fom Figures 6, 6a and 7, to a point just beyond the sewing machine needles 209 as seen in Figure 3. As will be understood from the right of Figure 19, the edges of the plate 130 serve to guide the doubled tapes 151 and 152, and the plate serves as an effective support for the fringe fabric up to the period when it is stitched and cut to form the duplicate fringes. The forward end of the plate is cut or slotted as will be understood from Figure 3 to permit the sewing machine needles 209 to function. In the machine seen in Figures 1 to 20, we have shown the transverse filaments as wound around the outer top and bottom surfaces of the doubled tapes 151 and 152, as they travel forwardly and are supported by the plate 130, as will be understood from Figure 19. In Figures 21 to 24 we have shown another embodiment of our invention, wherein duplicate fringes having a binder are produced of the character seen in Figure 25. In the structure seen in Figure 21, the parts 73, 82, 83, 108, 109, 110, 111, 116, 117, 130 and 184 are of the same construction, as already described, but the tape spools 210, are positioned at the sides of the machine, and the tapes 211 initially travel at a right angle to the longitudinal axis of the machine and after passing around the grooved forming rollers 212, rotatably mounted on the posts 215, they are each deflected at a right angle and caused to assume the U-shaped contour indicated at 213 in Figures 22, 23, and 25, at which period said tapes are positioned with respect to the guide plate 130, as seen in Figures 22 and 23.

In the construction seen in Figures 21, 22 and 23 the filaments 117 are wound transversely directly around the plate 130, and are then engaged by the doubled tapes 213, at the points where they are wound around the edges of the plate 130. The doubled tapes after leaving the U-shaped rollers 212, next pass through the oppositely located guide blocks 214, which have the stems 216, which pass through the brackets 217, which may be supported from the sewing machines 73. The stems 216 are provided with nuts 218, and the blocks 214 are under the tension of the springs 219, which resiliently hold said blocks with respect to the doubled tapes 213, which serve as binders or binding strips for the filaments. As the doubled tapes and filaments move forwardly from the tension blocks 214, they are stitched by the sewing machines 73 on the lines 220, directly after which the cutters 83 and 91 sever the filaments, as already described, thus producing duplicate fringes as indicated at 221 in Figure 25.

The fringes are drawn forwardly by the feed rollers 40 and 41, and it will be understood that the construction at the right of Figure 21 is the same as that seen in Figure 3, already described. The fringe seen in Figure 25 has an extremely finished and attractive appearance, as the U-shaped binding strip 213, completely encloses the filaments at the points where they are doubled and results in a very superior and durable fringe. It will be understood that while we have shown preferred forms of the actuating and driving mechanisms, which have been found to give very satisfactory results in practice. other equivalent forms may be employed if desired.

We are aware that the invention may be embodied in other specific forms without departing from the spirit or essential attributes thereof, and we therefore desire the present embodiment to be considered in all respects as illustrative and not restrictive, reference being had to the appended claims rather than to the foregoing description to indicate the scope of the invention.

Having thus described our invention what we claim as new and desire to secure by Letters Patent, is:—

1. In a device of the character stated, means for doubling upon itself each of a pair of parallel tapes, means for propelling said doubled tapes in parallelism, means for winding filaments transversely upon said doubled tapes, a stationary plate for internally supporting said filaments during their propulsion, means for stitching said filaments to each of said doubled tapes, a pair of rotary upper and lower cutters for said filaments, a presser foot above said filaments slotted to receive said upper cutter, and a lower supporting plate below said pressure foot having a slot therein to receive said lower cutter.

2. In a device of the character stated, a plate for internally supporting a pair of doubled tapes and filaments transversely wound thereon, comprising a body portion having parallel edges and V-shaped spring pressed members juxtaposed to said edges for doubling or folding each of said tapes upon itself.

3. In a device of the character stated, a rotary spool carrier, spools carried thereby, a stationary horizontal plate for internally supporting a fringe fabric, parallel edges on said plate, V-shaped spring pressed members coacting with said V-shaped edges for folding a pair of tapes, means for actuating the fringe fabric, and means for severing said fringe upon a central median line parallel to said tapes.

4. In a device of the character stated, a driving mechanism adapted to propel a pair of parallel tapes, means for doubling each of said tapes during its propulsion, a spacing plate intermediate said tapes, means for progressively winding a continuous filament about said doubled tapes to form a fabric, means for stitching said fabric to said doubled tapes, means for cutting said fabric intermediate of said tapes to form separate fringes, and means actuated by said driving mechanism for winding the separate fringes thus formed in predetermined lengths.

5. A fringe making machine of the character stated, comprising tape propelling devices, means for doubling each tape upon itself during its propulsion, means for winding a continuous filament around said doubled tapes, means for stitching said filament to said tapes to form a fabric, means for severing said fabric intermediate said tapes simultaneously to form separate fringes, revoluble winding drums including spaced inner and outer cylindrical members, adapted to receive flexible blanks positioned therebetween to receive said fringes, and means for detachably retaining said flexible blanks in position with respect to said drums during the winding of said fringes thereon.

6. A fringe making machine of the character stated, comprising means for feeding a plurality of tapes, tape doubling devices, means for winding continuous filaments around said doubled tapes, means for stitching said filaments to said tapes to form a fabric, means for severing said fabric intermediate said tapes to form separate fringes, upper and lower tension rollers for said fringes, revoluble winding drums including spaced inner and outer cylindrical members, adapted to receive flexible blanks positioned therebetween to receive said fringes, means for indicating the length of fringe wound around said blanks, and means for retaining said flexible blanks in position with respect to said cylindrical members.

7. A fringe making machine of the character stated, comprising a plurality of tape feeding devices, tape doubling devices including wedge shaped heads coacting with juxtaposed V-shaped slots through which the tapes travel, means for winding continuous filaments around said tapes, means for stitching said filaments to said tapes to form a fabric, means for severing said fabric intermediate said tapes to form separate fringes, revoluble winding drums including spaced inner and outer cylindrical members adapted to receive flexible blanks positioned therebetween to receive said fringes, and means for retaining said flexible blanks in position with respect to said cylindrical members.

8. A fringe making machine of the character stated comprising a plurality of tape feeding devices, means for winding continuous filaments around said tapes, tape doubling devices including a spacing plate having parallel edges engaging said doubled tapes to provide an internal support while said filaments are being wound around said tapes, means for stitching said filaments to said tapes to form a fabric, means for severing said fabric intermediate said tapes to form separate, fringes, revoluble winding drums including spaced inner and outer cylindrical members adapted to receive flexible blanks positioned therebetween to receive said fringes, and means for detachably retaining said flexible blanks in position on said drums during the winding operation.

9. In a fringe fabric making machine, a rotary spool carrier, a supporting plate for a fringe fabric extending forwardly from said spool carrier and having parallel edges, means in proximity to said edges for doubling a pair of tapes with respect thereto, means for propelling said tapes, a pair of oppositely disposed sewing machines, tension blocks in proximity to said plate edges and upper and lower centrally disposed rotary cutters for severing said fringe fabric to produce duplicate fringes.

10. In a fringe fabric making machine, a rotary spool carrier, a supporting plate for the fringe fabric extending forwardly from said spool carrier and having parallel edges, means in proximity to said edges for doubling a pair of tapes with respect thereto, means for propelling said tapes, a pair of oppositely disposed sewing machines, tension blocks in proximity to said plate edges, and upper and lower centrally disposed rotary cutters for severing said fringe fabric to produce duplicate fringes, in combination with rotary pockets, adapted to receive flexible blanks inserted therein for receiving predetermined lengths of fringe wound thereon.

11. In a fringe fabric making machine, a rotary spool carrier, a supporting plate for a fringe fabric extending forwardly from said spool carrier and having parallel edges, means adjacent said edges for doubling a pair of tapes thereover, a pair of oppositely disposed sewing machines, tension blocks in proximity to said plate edges, and upper and lower centrally disposed rotary cutters for severing said fringe fabric to produce duplicate fringes, in combination with rotary pockets adapted to receive detachable cores on which predetermined lengths of fringe may be wound.

12. In a fringe making machine, a rotary spool carrier, a supporting plate for a fringe fabric extnding forwardly from said spool carrier and having parallel edges, means in proximity to said edges for doubling a pair of tapes with respect thereto, a pair of oppositely disposed sewing machines, tension blocks in proximity to said plate edges and upper and lower centrally disposed rotary cutters for severing said fringe fabric to produce duplicate fringes, in combination with a presser foot, intermediate said upper cutter and plate and a lower slotted plate intermediate said lower cutter and presser foot.

PHILIP KRANZ.
ALBERT P. SCHMID.